(12) United States Patent
Matsuno et al.

(10) Patent No.: US 8,461,975 B2
(45) Date of Patent: Jun. 11, 2013

(54) OBSTACLE POSITION INDICATING APPARATUS AND SYSTEM

(75) Inventors: Tsutomu Matsuno, Okazaki (JP); Satoshi Nozoe, Kariya (JP)

(73) Assignee: Denso Corporation, Kariya (JP)

(*) Notice: Subject to any disclaimer, the term of this patent is extended or adjusted under 35 U.S.C. 154(b) by 210 days.

(21) Appl. No.: 13/167,817

(22) Filed: Jun. 24, 2011

(65) Prior Publication Data

US 2011/0316686 A1 Dec. 29, 2011

(30) Foreign Application Priority Data

Jun. 25, 2010 (JP) ................... 2010-145246

(51) Int. Cl.
*B60Q 1/00* (2006.01)

(52) U.S. Cl.
USPC ........ 340/435; 348/148; 348/149; 340/407.1; 340/407.2; 340/438; 340/903; 701/148; 701/149

(58) Field of Classification Search
USPC ............... 340/407.1, 407.2, 435, 436, 437, 340/438, 903, 937; 348/148, 149; 701/301
See application file for complete search history.

(56) References Cited

U.S. PATENT DOCUMENTS

2006/0097857 A1   5/2006   Osaka et al.
2008/0174415 A1   7/2008   Tanida et al.

FOREIGN PATENT DOCUMENTS

| JP | 9-164858 | 6/1997 |
| JP | P2000-335341 A | 12/2000 |
| JP | 2001-199296 | 7/2001 |
| JP | P2001-191875 A | 7/2001 |
| JP | P2005-35488 A | 2/2005 |
| JP | P2005-145292 A | 6/2005 |
| JP | P2005-280436 A | 10/2005 |
| JP | 2006-199094 | 8/2006 |

*Primary Examiner* — George Bugg
*Assistant Examiner* — Sharmin Akhter
(74) *Attorney, Agent, or Firm* — Nixon & Vanderhye PC (57) ABSTRACT

An obstacle position indicating apparatus is disclosed. In the apparatus, multiple actuators are arranged in a periphery of a conduction plate so as to give an external force to an end of the conduction plate in a planer direction of the conduction plate. A drive control component determines a ratio of magnitude of amplitude of designated two actuators in accordance with information on a direction to an obstacle and causes the designated two actuators to perform reciprocating motion in accordance with the determined ratio. The conduction plate conducts the vibration, which results from the reciprocating motion of the designated two actuators, to a hand of an occupant touching the conduction plate, thereby providing the occupant with the information on the direction to the obstacle.

10 Claims, 6 Drawing Sheets

|  | K1 | K2 | K3 | K4 | K5 | K6 |
|---|---|---|---|---|---|---|
| SOLENOID 4b | 100% | 80% | 60% | 40% | 20% | 0% |
| SOLENOID 4c | 0% | 20% | 40% | 60% | 80% | 100% |

OBSTACLE POSITION INDICATING APPARATUS AND SYSTEM

CROSS REFERENCE TO RELATED APPLICATION

The present application is based on and claims priority to Japanese Patent Application No. 2010-145246 filed on Jun. 25, 2010, disclosure of which is incorporated herein by reference.

BACKGROUND

1. Technical Field

The present disclosure relates to an obstacle position indicating apparatus and an obstacle position indicating system for indicating information about position of an obstacle around a vehicle to a driver.

2. Description of Related Art

Patent Document 1: JP-H9-164858A

Patent Document 2: JP-2006-119840A corresponding to US 2006/0097857A

Patent Document 3: JP-2006-199094A

Various techniques for assisting a driver in understanding a situation around a vehicle are known. For example, an obstacle around the vehicle is detected with a sensor attached to a vehicle, such as an imaging device, an ultrasonic sonar, a millimeterwave radar and the like. A detection result is provided to a driver by speech output from a speaker or display on a monitor.

However, when the obstacle detection result is provided by the speech output, it is difficult for the driver to understand the position of the obstacle. When the obstacle detection result is provided by the display on the monitor, it is difficult for the driver who is driving the vehicle to check the position of the obstacle. To address the above difficulties, a technique for providing an obstacle detection result to a driver through a tactile feeling has been proposed in recent years.

For example, Patent Document 1 discloses that multiple vibrators are arranged in a seat of a vehicle, and a specific vibrator is selected and vibrated to indicate the obstacle detection result. More specifically, when a distance to a rear obstacle detected with an obstacle sensor become smaller, the vibrator to be vibrated is changed from that at front portion of the seat to that at a rear portion of the seat, and thereby, the distance to the obstacle is indicated to the driver.

Patent Document 2 discloses providing an obstacle detection result by changing driving frequency or driving force of multiple tactile information transmission elements arranged in a seat of the vehicle. More specifically, when the distance to an obstacle detected with the obstacle sensor becomes smaller, the driving frequency or the driving force of the tactile information transmission element is made larger, whereby the driver understands the information about the distance to the obstacle.

The techniques disclosed in Patent Documents 1 and 2 provide the obstacle detection result to the driver through providing the tactile feeling to a back or a thigh of the driver. Since the back or the thigh of the driver is a part of a human body where peripheral nerves are concentrated not too much, it is difficult for the driver to specifically figure out the position of the obstacle.

In this relation, Patent Document 3 discloses the following technique. Tactile feeling rollers are consecutively arranged in a steering wheel in a circumferential direction of the steering wheel. The timing of protruding the tactile feeling rollers is delayed, so that the driver who is touching an area with the tactile feeling rollers can feel that the tactile feeling moves in the circumferential direction, and the driver can catch the distance to the obstacle. In the technique disclosed in Patent Document 3, a first group of tactile feeling rollers are consecutively arranged in a right portion of the steering wheel in the circumferential direction. A second group of tactile feeling rollers are consecutively arranged in a left portion of the steering wheel in the circumferential direction. A first motor is mounted to the right portion of the steering wheel to drive the first group of tactile feeling rollers, and a second motor is mounted to the left portion of the steering wheel to drive the second group of tactile feeling rollers.

In the technique disclosed in Patent Document 3, however, in order to receive the obstacle detection result, the driver needs to always have direct contact with an area having the tactile feeling rollers. This causes less usability. Furthermore, in the technique disclosed in Patent Document 3, a indicating-possible direction, which is a direction that can be indicated to the driver via the tactile feeling, is limited to a direction (i.e., the circumferential direction of the steering wheel) in which the tactile feeling rollers are arranged. Thus, the technique disclosed in Patent Document 3 has a difficulty in specifically indicating the position to the driver. The number of indicating-possible directions can increase with an increasing number of directions in which the tactile feeling rollers are arranged. However, as the number of indicating-possible directions increases, the number of required tactile feeling rollers increases to a huge number; accordingly, cost increases and an installation space for the tactile feeling rollers increases. In this regard also, the technique disclosed in Patent Document 3 has a difficulty in specifically indicating the position of the obstacle to the driver.

SUMMARY

In view of the foregoing, it is an objective of the present disclosure to provide an obstacle position indicating apparatus and an obstacle position indicating system that can specifically indicate position of an obstacle to an occupant via tactile feeling and that can have high usability.

According to a first aspect of the present disclosure, an obstacle position indicating apparatus is mounted to a vehicle and configured to indicate information on position of an obstacle existing around the vehicle to an occupant of the vehicle. The obstacle position indicating apparatus includes an obstacle position identification component, multiple actuators, a conduction plate and a drive control component. The obstacle position identification component is configured to identify the position of the obstacle based on a detection result of a sensor configured to detect the obstacle existing around the vehicle, such that the information on the position of the obstacle includes at least information on a direction to the obstacle relative to the vehicle. Each actuator is configured perform reciprocating motion. The conduction has a conduction plate and is mounted to equipment of the vehicle so that the conduction plate contacts the occupant when the equipment is being operated by the occupant. The conduction plate is configured to conduct vibration generated by an external force caused by the reciprocating motion of the actuators. The drive control component is configured to control the reciprocating motion of the actuators in respect to at least magnitude of amplitude of the reciprocating motion. The multiple actuators are spaced apart from each other and arranged in a periphery of the conduction plate so as to give the external force to an end of the conduction plate in a planer direction of the conduction plate. The periphery of the conduction plate and the end of the conduction plate are, respectively, the periphery and the end in the planer direction of the conduction plate. The drive control component is further configured to determine a ratio of magnitude of amplitude of designated two actuators, which are included in the multiple actuators, in accordance with the information on the direction to the obstacle identified by the obstacle position identification component. The drive control component is further configured to cause the designated two actuators to perform the reciprocating motion in accordance with the determined ratio of magnitude of amplitude of the designated two actuators. A direction of the reciprocating motion of one of the designated two actuators is a same direction or a cross direction with respect to that of the other of the designated two actuators. The conduction plate is configured to conduct the vibration, which results from the reciprocating motion of the designated two actuators, to a hand of the occupant touching the conduction plate, thereby indicating the occupant with the information on the direction to the obstacle.

According to a second aspect of the present disclosure, an obstacle position indicating system includes the above-described obstacle position indicating apparatus and a sensor configured to detect the obstacle existing around the vehicle.

The above obstacle position indicating apparatus and the obstacle position indicating system can specifically present position of an obstacle to an occupant via tactile feeling, and can have high usability.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF EMBODIMENTS

Figure 1:
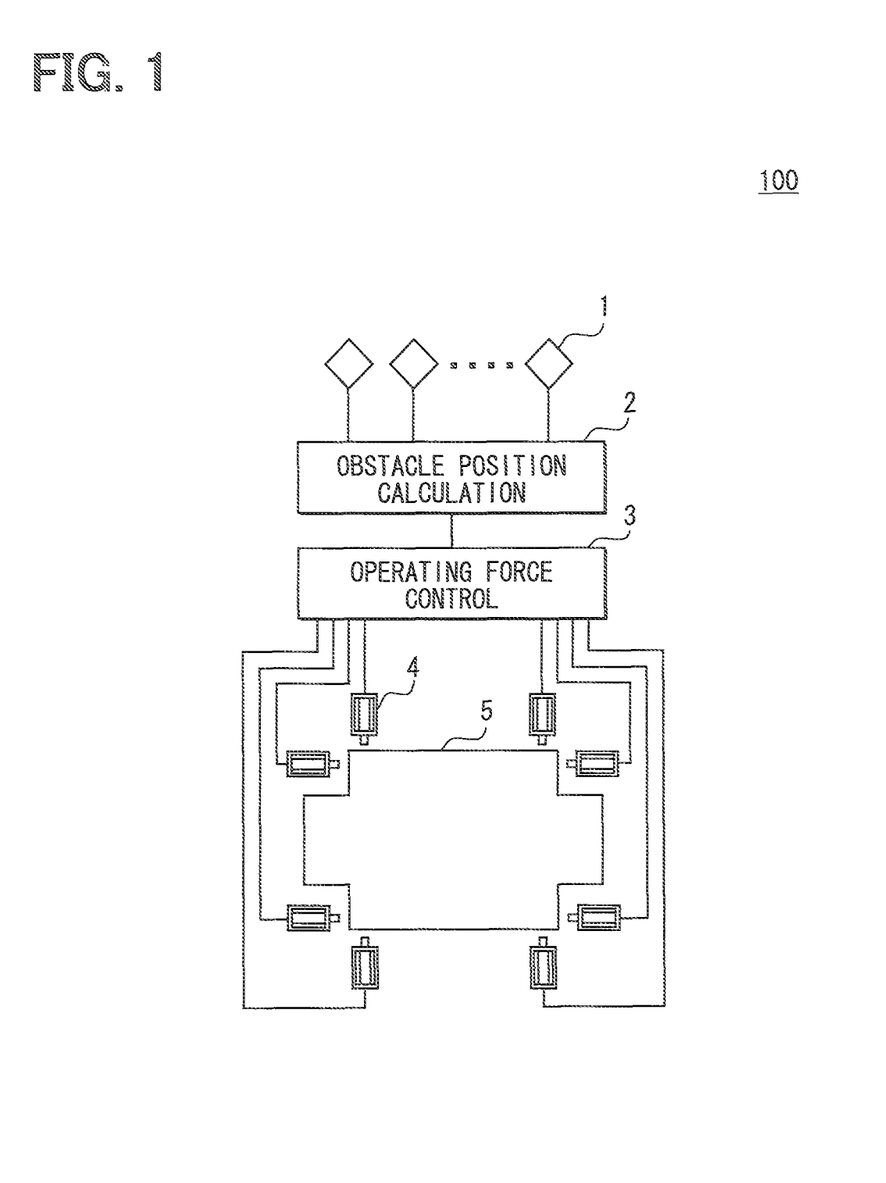
FIG. 1 is a block diagram illustrating an obstacle position indicating system.

Embodiments will be described below with reference to the accompanying drawings. FIG. 1 is a block diagram schematically illustrating an obstacle position detection system 100 of one embodiment. The obstacle position detection system 100 illustrated in FIG. 1 is mounted to a vehicle, and includes an obstacle detection sensor 1, an obstacle position calculation device 2, an operating force control device 3, multiple solenoids 4, and a vibration conduction plate 5. The obstacle position calculation device 2, the operating force control device 3, the solenoids 4 and the vibration conduction plate 5 constitute an obstacle position indicating apparatus. The vehicle equipped with the obstacle position detection system 100 is also referred to herein as "subject vehicle".

Figure 2:
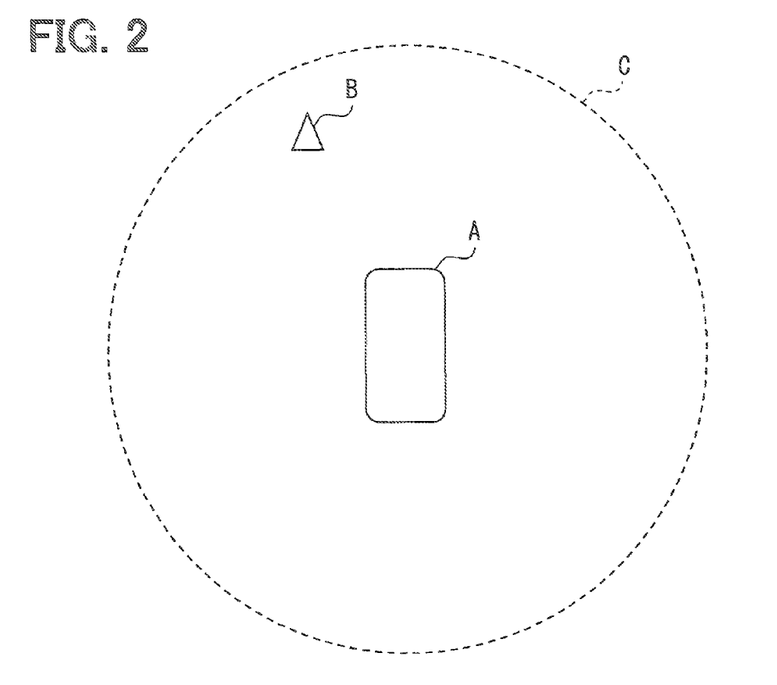
FIG. 2 is a diagram for explanation on detection of an obstacle by an obstacle detection sensor.

The obstacle detection sensor 1 is mounted to the subject vehicle. As shown in FIG. 2, the obstacle detection sensor 1 has a sensor detection range and detects an obstacle existing in the sensor detection range around the subject vehicle. The obstacle detection sensor 1 is an example of a sensor configured to detect an obstacle existing around a vehicle. FIG. 2 is a diagram for explanation on detection of the obstacle by the obstacle detection sensor 1. In FIG. 2, a reference mark "A" refers to the subject vehicle. A periphery of the subject vehicle surrounded by a dashed-line "B" refers to the sensor detection range of the obstacle detection sensor 1. A reference mark "C" refers to the obstacle.

A range sensor can be used as the obstacle detection sensor 1. The range sensor may be ultrasonic sonar, millimeter wave radar, laser radar, infrared sensor, or the like. Note that a typical range sensor transmits an original wave (search wave) and receives a reflected wave, which is the original wave reflected by the obstacle. Alternatively, the obstacle detection sensor 1 may use, as the obstacle detection sensor 1, an imaging device for imaging the periphery of the vehicle such as a CCD (charged-coupled device) camera and the like. The obstacle detection sensor 1 may use a combination of the range sensor and the imaging device as the obstacle detection sensor 1. The obstacle position detection system 100 may include multiple obstacle detection sensors 1 to meet a target sensor detection range.

The obstacle position calculation device 2 includes a microcomputer as a main component. The microcomputer includes a CPU (central processing unit), a ROM (read-only memory), a RAM (random access memory), a backup RAM and the like. The obstacle position calculation device 2 identifies position of the obstacle relative to the subject vehicle by executing various control programs stored in the ROM, based on a sensor signal inputted from the obstacle detection sensor 1. In the above, the position of the obstacle to be identified may include a distance to the obstacle relative to the subject vehicle, a direction to the obstacle relative to the subject vehicle or the like. The sensor signal indicates a detection result of the obstacle detection sensor 1. The obstacle position calculation device 2 can correspond to a drive control component configured to control actuators.

When the range sensor such as the ultrasonic sonar and the like is used as the obstacle detection sensor 1, the obstacle position calculation device 2 may calculate a distance to the obstacle based on a mismatch between the timing of transmitting the search wave and the timing of receiving the reflected wave (the reflected search wave). The obstacle position calculation device 2 may calculate, by triangulation, a direction to the obstacle relative to the subject vehicle based on distance data that is calculated from sensor signals of multiple ultrasonic sonars. Alternatively, the obstacle position calculation device 2 may calculate the direction and distance to the object relative to the subject vehicle in other known manners.

When the imaging device is used as the obstacle detection sensor 1, the obstacle position calculation device 2 may detect, by a known image recognition processing technique or the like, the direction to the object relative to the subject vehicle based on the image captured by the imaging device. When the distance between the subject vehicle and the obstacle can be estimated and calculated based on the image captured by the imaging device, the obstacle position calculation device 2 may detect the distance between the subject vehicle and the obstacle based on the captured image.

Each solenoid 4 is a kind of electric actuator, and includes a movable iron core in a coil. The solenoid 4 converts supplied electric power into mechanical linear motion to drive the movable iron core. The solenoid 4 may use, for example, a spring force to reciprocate the movable iron core. Alternatively, the solenoid 4 may be provided with two system of driving circuits, by which the movable iron core is reciprocatable. The reciprocating motion of the movable iron core of the solenoid 4, which is also referred to as the reciprocating motion of the solenoid 4, is controlled by the operating force control device 3. The solenoid 4 is an example of actuator.

The vibration conduction plate 5 is a plate member made of, for example, resin. The vibration conduction plate 5 conducts vibration resulting from an external force given by the reciprocating motion of the solenoid 4. For example, the vibration conduction plate 5 is arranged in a center portion of the steering wheel while being displaced from an installation place of an airbag, so that a planer surface of the vibration conduction plate 5 is substantially parallel to a plane defined on the steering wheel. Further, the vibration conduction plate 5 is fixed to the steering wheel to such an extent that the vibration conduction plate 5 can displace in some degrees in a planer direction of the vibration conduction plate 5. Herein, the planer direction is a direction parallel to the planer surface of the vibration conduction plate. The vibration conduction plate 5 is mounted so that when an occupant operates the steering wheel, the occupant can touch the vibration conduction plate 5 while operating the steering wheel. The vibration conduction plate is an example of conduction plate.

Figure 3A:
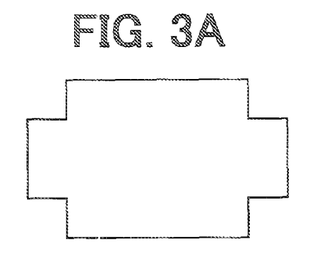
FIGS. 3A to 3C are diagrams each illustrating an example of shape of a planer surface of a vibration conduction plate.
Figure 3B:
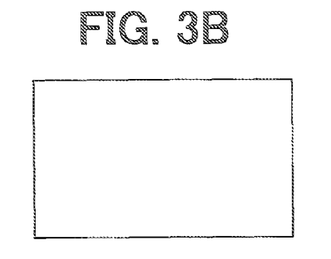
Figure 3C:
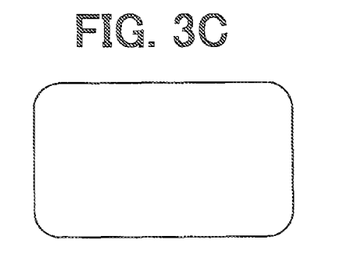

As shown in FIG. 3A, the planer surface of the vibration conduction plate 5 may have, for example, a cross shape. Alternatively, as shown in FIG. 3B, the planer surface may be quadrilateral, e.g., rectangular. Alternatively, as shown in FIG. 3C, the planer surface may have a rectangular shape with a rounded corner. Alternatively, the planer surface may have other shapes such as an ellipsoidal shape and the like. In the following explanation, it is assumed that the planer surface of the vibration conduction plate 5 has a cross shape, as shown in FIG. 3A.

Figure 4:
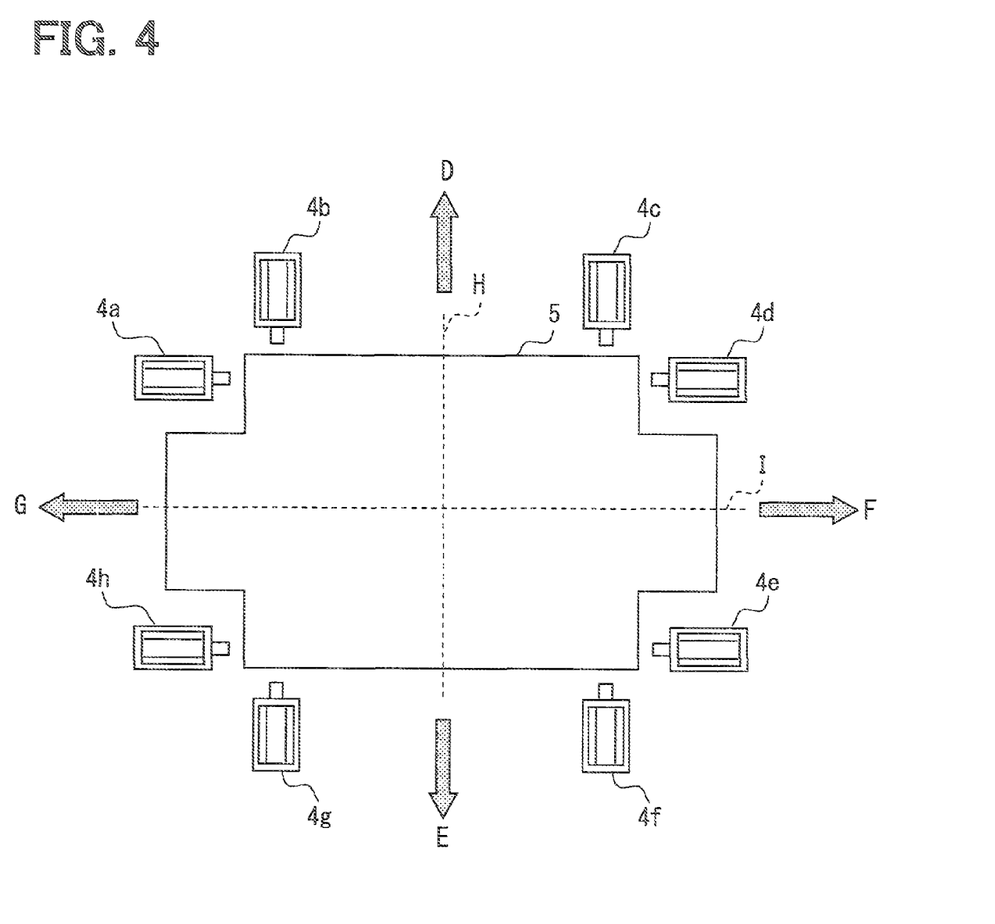
FIG. 4 is a diagram illustrating an example of positional arrangement of solenoids relative to a vibration conduction plate.

Now, a positional arrangement of the solenoids 4 relative to the vibration conduction plate 5 will be described. FIG. 4 is a diagram illustrating an example of positional arrangement of the solenoids 4 relative to the vibration conduction plate 5. In FIG. 4, an arrow "D" refers to an upper direction when the steering wheel is in a normal position. An arrow "E" refers to a lower direction when the steering wheel is in the normal position. An arrow "F" refers to a right direction when the steering wheel is in the normal position. An arrow "G" refers to a left direction when the steering wheel is in the normal position.

An axis "H" of the vibration conduction plate 5 is a first reference axis that extends in the upper direction and the lower direction when the steering wheel is in the normal position. The axis "H" corresponds to a front-back direction of the subject vehicle. An axis "I" of the vibration conduction plate 5 is a second reference axis that extends in the left direction and the right direction when the steering wheel is in the normal position. The axis "I" corresponds to a left-right direction of the subject vehicle. The axis "H" and the axis "I" intersect each other at right angles on a surface of the vibration conduction plate 5 at, for example, the position of the center of gravity of the vibration conduction plate 5.

As shown in FIG. 4, eight solenoids 4a to 4h are arranged relative to the vibration conduction plate 5. Specifically, the axis "H" and the axis "I" divide the vibration conduction plate 5 into four regions. Two solenoids are arranged for each of the four regions so that a direction of the reciprocating motion of one of the two solenoids is parallel to the axis "H", and a direction of the reciprocating motion of the other of the two solenoids is parallel to the axis "I". More specifically, the direction of the reciprocating motion of each of the solenoids 4a, 4d, 4e and 4h is parallel to the axis "I". The direction of the reciprocating motion of each of the solenoids 4b, 4c, 4f and 4g is parallel to the axis "H".

Each of the solenoids 4a to 4h is arranged so that the reciprocating motion of each solenoid 4a to 4h gives the external force to an end of the vibration conduction plate 5 in the planer direction of the vibration conduction plate 5. In the above, the end of the vibration conduction plate 5 is an end in the planer direction of the vibration conduction plate 5, and the external force also acts in the planer direction of the vibration conduction plate 5. When the solenoid 4 applies the external force to the end of the vibration conduction plate 5 by the reciprocating motion, the solenoid 4 may apply the external force to the end by directly tapping the end with the movable iron core. Alternatively, the solenoid 4 may apply the external force to the end by tapping the end via a member connected to the movable iron core.

In the above example configuration, the vibration conduction plate 5 is mounted to the steering wheel. However, the vibration conduction plate 5 may be mounted to other parts. The vibration conduction plate 5 may be mounted to vehicle equipment that is to be manipulated by the occupant of the vehicle with his or her hand. For example, the vibration conduction plate 5 may be mounted to a manipulation device mounted to a center console.

Description returns to FIG. 1. The operating force control device 3 includes a microcomputer as a main component. The microcomputer includes a CPU, a ROM, a RAM, a backup RAM and the like. Based on various information inputted from the obstacle position calculation device 2, the operating force control device 3 controls the solenoid 4 by executing various control programs stored in the ROM. The operating force control device 3 can correspond to a drive control component.

For example, the operating force control device 3 performs an amplitude determination process to determine a ratio of magnitude of amplitude of designated two solenoids 4 in accordance with the direction to the obstacle relative to the subject vehicle identified by the obstacle position calculation device 2. In the above, the designated two solenoids 4 are two of the solenoids 4a to 4h. Herein, the amplitude expresses a driving force (pushing force) due to the reciprocating motion of the solenoid 4. The operating force control device 3 may control the amplitude of the solenoid 4 by PWM (pulse width modulation) control, voltage control or the like.

Figure 5:
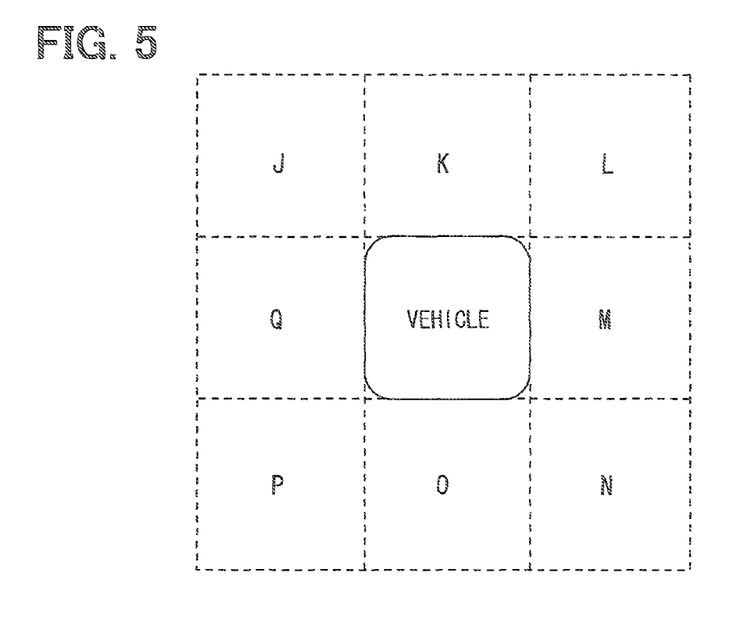
FIG. 5 is a diagram illustrating an example of division of an all-around periphery of a vehicle into multiple areas.

The designated two solenoids 4 are two solenoids that are selected from among the multiple solenoids 4a to 4h by the operating force control device 3 in accordance with information on the direction to the obstacle relative to the subject vehicle. In the following, a manner of selecting the designated two solenoids 4 from the multiple solenoids 4a to 4h will be described in details with reference to FIG. 5. FIG. 5 is a diagram illustrating an example of division of an all-round periphery of the vehicle into multiple areas.

In FIG. 5, an area "J" is an area diagonally forward left of the subject vehicle. An area "K" is an area forward of the subject vehicle. An area "L" is an area diagonally forward right of the subject vehicle. An area "M" is an area rightward of the subject vehicle. An area "N" is an area diagonally rearward right of the subject vehicle. An area "O" is an area rearward of the subject vehicle. An area "P" is an area diagonally rearward left of the subject vehicle. An area "Q" is an area leftward of the subject vehicle.

For example, when the direction to the obstacle corresponds to the area "J", the solenoids $4a$ and $4b$ are selected as the designated two solenoids. When the direction to the obstacle corresponds to the area "K", the solenoids $4b$ and $4c$ are selected as the designated two solenoids. When the direction to the obstacle corresponds to the area "L", the solenoids $4c$ and $4d$ are selected as the designated two solenoids. When the direction to the obstacle corresponds to the area "M", the solenoids $4d$ and $4e$ are selected as the designated two solenoids. When the direction to the obstacle corresponds to the area "N", the solenoids $4e$ and $4f$ are selected as the designated two solenoids. When the direction to the obstacle corresponds to the area "O", the solenoids $4f$ and $4g$ are selected as the designated two solenoids. When the direction to the obstacle corresponds to the area "P", the solenoids $4g$ and $4h$ are selected as the designated two solenoids. When the direction to the obstacle corresponds to the area "Q", the solenoids $4h$ and $4a$ are selected as the designated two solenoids.

Figure 6A:
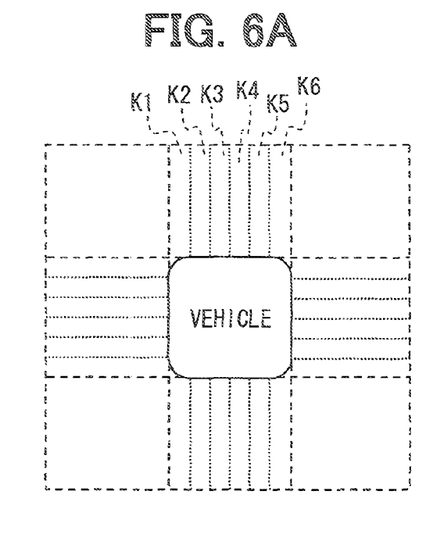
FIG. 6A is a diagram illustrating an example of division of an forward area, a rearward area, a leftward area and a rightward area into multiple sub-areas.
Figure 6B:
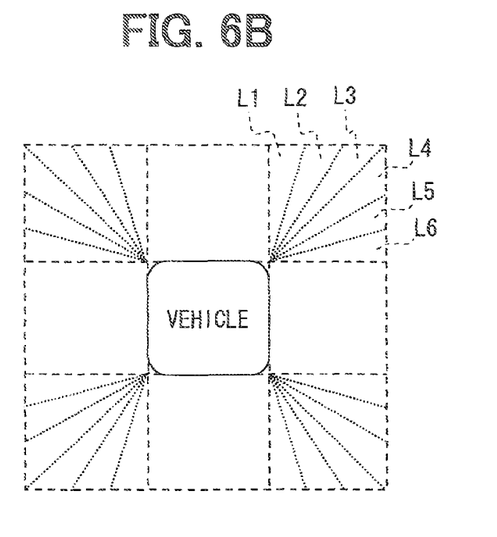
FIG. 6B is a diagram illustrating an example of division of each diagonal area into multiple sub-areas.

The ratio of magnitude of amplitude of the designated two solenoids 4 is determined based on which of sub-areas of the area (one of the area J to Q) corresponds to the direction to the obstacle. More specifically, the area (one of the areas J to Q) corresponding to the direction to the obstacle is further divided into multiple sub-areas. It is determined which of the multiple sub-areas corresponds to the direction to the obstacle relative to the subject vehicle. From the sub-area determined to correspond to the direction to the obstacle, the ratio of magnitude of amplitude of the designated two solenoids 4 is determined. Now, a manner of determining the ratio of magnitude of amplitude of the designated two solenoids 4 will be more specifically described with reference to FIGS. 6A and 6B. FIG. 6A is a diagram illustrating an example manner of dividing, into multiple sub-areas, the areas frontward, rearward leftward and rightward of the subject vehicle. FIG. 6B is a diagram illustrating an example manner of dividing the areas diagonal of the subject vehicle.

Each of the areas K and O, which are located respectively frontward and rearward of the subject vehicle, is divided in, for example, six sub-areas in a width direction of the vehicle. Each of the areas M and Q, which are located leftward and rightward of the subject vehicle, is divided in, for example, six sub-areas in a longitudinal direction of the vehicle. For example, the area K is divided into six sub-areas K1 to K6, which numbering starts from the left, as shown in FIG. 6A.

Figure 7:
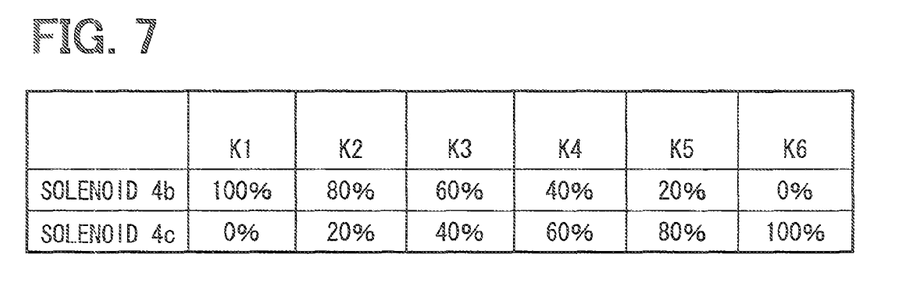
FIG. 7 is a diagram illustrating a relationship between sub-area and a ratio of magnitude of amplitude of designated two solenoids.

The ratio of magnitude of amplitude of the designated two solenoids 4 is determined in accordance with a relationship (table) illustrated in, for example, FIG. 7. FIG. 7 is a diagram illustrating an example of a correspondence relationship (table) between the sub-area and the ratio of magnitude of amplitude of the designated two solenoids 4.

For example, as shown in FIG. 7, when the direction to the obstacle corresponds to the sub-area K1, the operating force control device 3 determines that the ratio of magnitude of amplitude of the solenoids $4b$ to that of the solenoids $4b$ is 100%:0%. When the direction to the obstacle corresponds to the sub-area K2, the operating force control device 3 determines that the ratio of magnitude of amplitude of the solenoid $4b$ to that of the solenoid $4c$ is 80%:20%. When the direction to the obstacle corresponds to the sub-area K3, the operating force control device 3 determines that the ratio of magnitude of amplitude of the solenoid $4b$ to that of the solenoid $4c$ is 60%:40%. When the direction to the obstacle corresponds to the sub-area K4, the operating force control device 3 determines that the ratio of magnitude of amplitude of the solenoid $4b$ to that of the solenoid $4c$ is 40%:60%. When the direction to the obstacle corresponds to the sub-area K5, the operating force control device 3 determines that the ratio of magnitude of amplitude of the solenoid $4b$ to that of the solenoid $4c$ is 20%:80%. When the direction to the obstacle corresponds to the sub-area K6, the operating force control device 3 determines that the ratio of magnitude of amplitude of the solenoid $4b$ to that of the solenoid $4c$ is 0%:100%. In the substantially same manner as that described above, the operating force control device 3 determines the ratio of magnitude of amplitude of the two solenoids 4 corresponding to the areas M, O and Q.

Each of the areas located diagonal of the subject vehicle (i.e., the areas J, L, N, P) is divided into, for example, six sub-areas in an angular direction. For example, as shown in FIG. 6B, the area L is divided into six sub-areas L1 to L6, which numbering starts from the front to the lateral side of the vehicle. In the substantially same manner as that described for the areas K, M, O and Q, the operating force control device 3 determines the ratio of magnitude of amplitude of the two solenoids 4 corresponding to the areas J, L, N and P.

In the above example configuration, each area is divided into six sub-areas. However, the number of sub-areas is not limited to the above example. For example, the area may be divided more coarsely or finely. Further, the area can be divided at regular spatial intervals or irregular spatial intervals. The correspondence relationship between the sub-area and the ratio of magnitude of amplitude of the designated two solenoids 4 is not limited to the above example, and may be arbitrarily settable.

In the above example, the ratio of magnitude of amplitude of the designated two solenoids 4 is determined based on which of the sub-areas corresponds to the direction to the obstacle. However, a manner of determining the ratio is not limited to the above-descried manner. For example, a function (mathematical function) is prepared for calculating the ratio of magnitude of amplitude of the designated two solenoids 4 in accordance with a coordinate point (position) of the obstacle. By using this function, the ratio of magnitude of amplitude of the designated two solenoids 4 is determined in accordance with the coordinate point (position) of the obstacle.

Figure 8A:
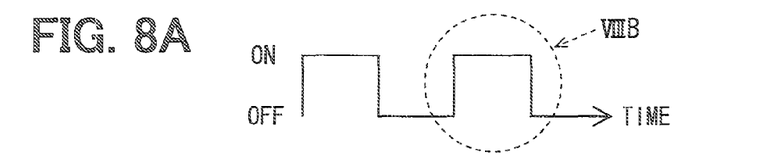
FIG. 8A is a diagram illustrating an example of on/off period of reciprocating motion of a solenoid.
Figure 8B:
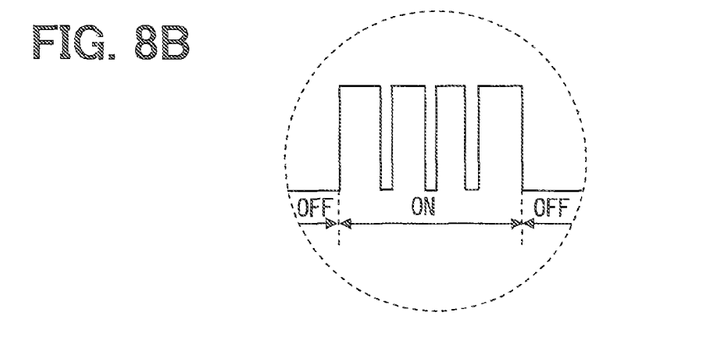
FIG. 8B is an enlarged view of a region surrounded by line VIIIB in FIG. 8A.

The operating force control device 3 performs a period determination process to determine the period of the reciprocating motion (with the above-described amplitude) of each of the two solenoids selected at the amplitude determination process, such that period is determined in accordance with the information on the distance to the obstacle from the subject vehicle identified by the obstacle position calculation device 2 (which can act as am obstacle position identification component). The period described herein may refer to an on/off cycle of the reciprocating motion of the solenoid 4. An on state during the repeating on/off cycles of the reciprocating motion of the solenoid 4 may not limited to a 100% on state. As shown in FIGS. 8A and 8B, a state where the on state and the off state are repeated at short time intervals may constitute the on state. FIGS. 8A and 8B are diagrams illustrating the on/off period of the reciprocating motion of the solenoid 4. The on state of the reciprocating motion of the solenoid 4 is not limited to such a rectangular wave pattern as illustrated in FIG. 8A but may be other patterns.

Figure 9:
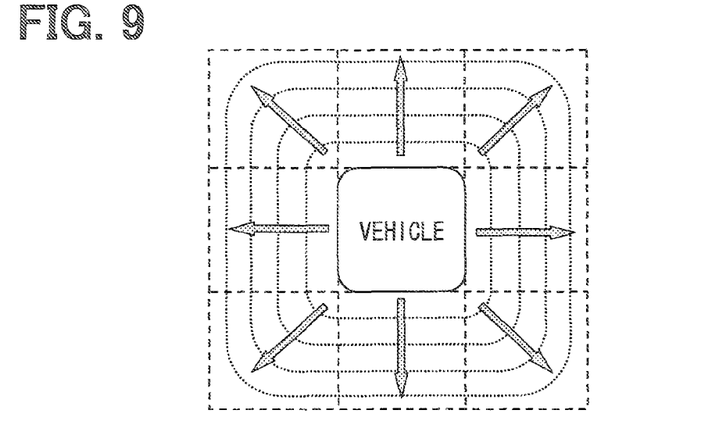
FIG. 9 is a diagram for explanation on how period of reciprocating motion of a solenoid depends on a distance to an obstacle from a vehicle.

In the period determination process, the period is made larger (longer) as the distance to obstacle from the subject vehicle is larger, and, the period is made smaller (shorter) as the distance to obstacle from the subject vehicle is smaller. In FIG. 9, as the obstacle becomes distant in a direction indicated by "arrow in FIG. 9", the period is set larger. In the above, the period may be linearly changed with increasing and decreasing distance to the obstacle. Alternatively, the period may be changed in a curved (non-linear) manner, in a stepwise manner or the like by using a function (mathematical function) or mapping.

The operating force control device 3 controls the two solenoids 4 selected at the amplitude determination process, so that the reciprocating motion has (i) the amplitude, which is in accordance with the ratio of magnitude of amplitude determined at the amplitude determination process, and (ii) the period, which is determined at the period determination process. It should be noted that the operating force control device 3 does not drive the remaining solenoids, which have not been selected at the amplitude determination process.

Figure 10:
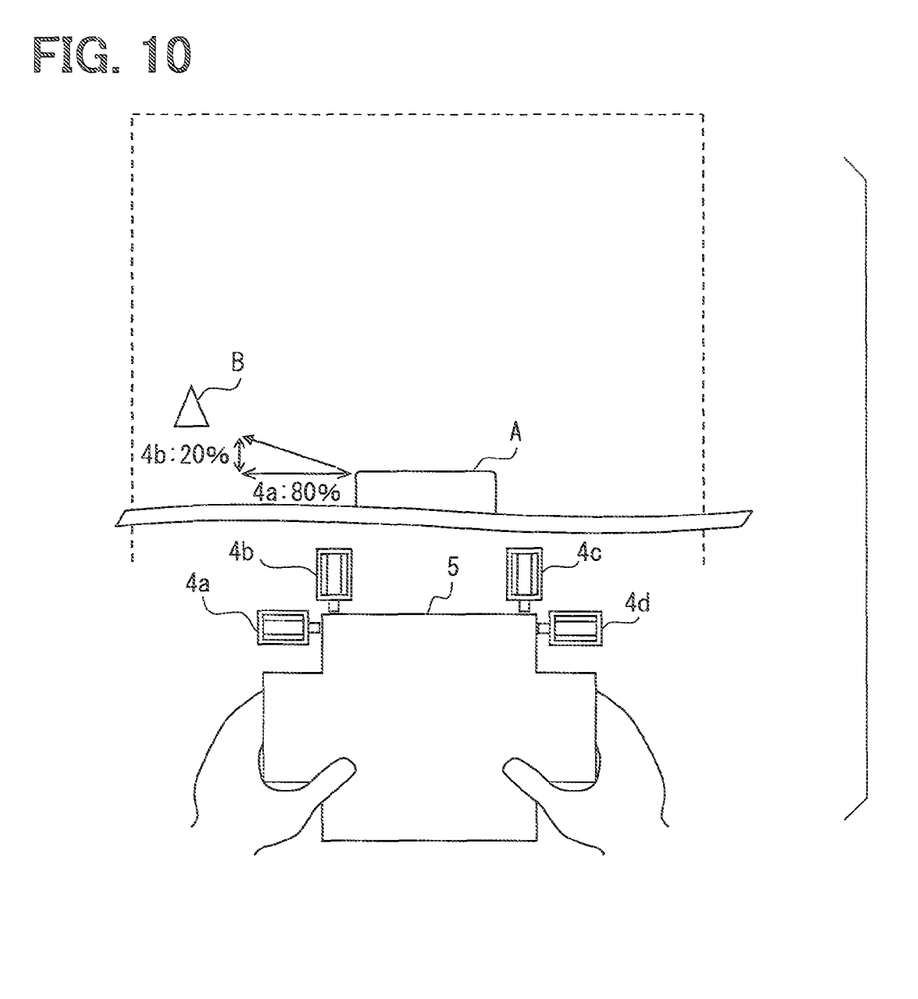
FIG. 10 is a diagram illustrating a case where obstacle direction information is indicated to an occupant.

Now, a specific example of a manner of indicating the obstacle direction to an occupant will be described with reference to FIG. 10. FIG. 10 is a diagram illustrating a manner of indicating obstacle direction information to an occupant. For simplicity, the solenoids 4e to 4h are omitted from FIG. 10. In FIG. 10, the direction to the obstacle is assumed to correspond to the sub-area J2 of the area J.

In the example shown in FIG. 10, since the direction to the obstacle corresponds to the area J, the solenoids 4a and 4b are selected at the amplitude determination process. Further, since the direction to the obstacle corresponds to the sub-area J2, it is determined that the ratio of magnitude of amplitude of the solenoid 4a to that of the solenoid 4b is 80%:20%.

Then, under control of the operating force control device 3, the solenoids 4a and 4b are driven with the 80%:20% ratio of magnitude of amplitude of the solenoid 4a to that of the solenoid 4b. In this case, the vibration in the vibration conduction plate 5 generated due to the reciprocating motion of the solenoid 4a and that generated due to the reciprocating motion of the solenoid 4b are combined together, and the combined vibration is transmitted to the hand of the occupant who is touching the vibration conduction plate 5. Specifically, the occupant feels that the vibration is transmitted in a direction from the left to a near side (from the left of the occupant to the body of the occupant) with a left-to-right component of approximately 80% and a far-to-near component of approximately 20%.

The inventors of the present application have discovered that when the vibration conduction plate 5 is vibrated by varying the ratio of magnitude of amplitude of the two solenoids 4 spaced a predetermined interval apart from each other, the occupant (e.g., driver, fellow passenger) touching the vibration conduction plate 5 with his or her hand feels the following direction as a vibration source. The direction felt as the vibration source is a direction between the two solenoids 4 that corresponds to the ratio of magnitude of amplitude of the two solenoids. The above configuration allows the occupant to feel, as the vibration source, not only directions in which the solenoids 4 are located but also directions in which the solenoids 4 are not located. It is therefore possible to more specifically indicate the information on the position of the obstacle to the occupant.

Moreover, according to the above obstacle position indicating system 100, since the directions that the occupant can feel as the vibration source include not only directions in which the solenoids 4 are located but also directions in which the solenoid 4 are not located. That is, the occupant can feel directions between the solenoids 4 as the vibration source. Therefore, an increase in the number of solenoids 4 can be suppressed even when the number of indicating-possible directions is increased. In the above, the indicating-possible directions are directions that the obstacle position indicating system 100 can indicate to the occupant. As described above, when the directions covering the all-round periphery of the vehicle are indicating-possible directions, the number of required solenoids 4 can be reduced to eight. Moreover, since the vibration from the solenoid 4 is transmitted to the hand of the occupant via the vibration conduction plate 5, the occupant when receiving the information on the position of the obstacle is not required to have direct contact with a portion in which the solenoids 4 are located.

Moreover, the inventors of the present application have discovered the following. When the vibration conduction plate 5 is vibrated by varying the ratio of magnitude of amplitude of the two solenoids 4 spaced apart from each other, and when the reciprocating motion of each solenoid 4 gives the external force to the end of the vibration conduction plate 5 in the planer direction of the vibration conduction plate 5 to vibrate the vibration conduction plate 5, the occupant touching the vibration conduction plate 5 with his or her hand can accurately feel, as the vibration source, the direction between the two solenoids 4 that corresponds to the ratio of magnitude of amplitude of the two solenoids 4.

The above advantage will be specifically described with reference to an example case where the vibration conduction plate 5 is mounted to the steering wheel. When the external force in the planer direction of the vibration conduction plate 5 is applied to the end, which is an end in the planer direction, of the vibration conduction plate 5 due to the reciprocating motion of the designated two solenoids 4, the external force create a displacement between the vibration conduction plate 5 and the steering wheel. By sensing the displacement, the occupant touching the vibration conduction plate 5 can easily sense a direction of propagation of the vibration. It should be noted that, unlike the above displacement, the passenger touching the vibration conduction plate 5 cannot easily sense the direction of propagation of a vibration if the vibration is given by an external force that is applied to the vibration conduction plate 5 in a direction normal to the planer surface of the vibration conduction plate 5.

Since a direction of the above-described displacement corresponds to the direction to the obstacle relative to the subject vehicle, the occupant touching the vibration conduction plate 5 can specifically and more easily sense the direction to the obstacle relative to the subject vehicle by sensing the displacement.

Moreover, according to the above obstacle position indicating system 100, the on/off period of the reciprocating motion of the solenoid 4 is made smaller as the distance to the obstacle identified by the obstacle position calculation device 2 becomes smaller. Thus, period of vibration of the vibration conduction plate 5 becomes larger as the distance to the obstacle is larger, and, the period of vibration of the vibration conduction plate 5 becomes smaller as the distance to obstacle is smaller. As a result, the occupant can intuitively recognize the distance to the obstacle by perceiving a state of the vibration transmitted via the vibration conduction plate 5. More specifically, since the period of the vibration of the vibration conduction plate 5 is made smaller with decreasing distance to the obstacle, it is possible to give a sense of urgency to the passenger via his or her hand, thereby more easily achieving the specifically indicating of the distance to the obstacle.

The obstacle position indicating system 100 may be configured such that when the obstacle position calculation device 2 identifies positions of multiple obstacles, the information on, for example, the position of only one obstacle nearest to the subject vehicle may be indicated. Specifically, based on the information on the distances to the multiple obstacles identified by the obstacle position calculation device 2, the operating force control device 3 selects an obstacle nearest to the subject vehicle from among the multiple obstacles. Based on the information on the distance or the direction to the nearest obstacle, the operating force control device 3 performs the amplitude determination process and the period determination process to control the designated two solenoids 4. Then, the information on only the position of the obstacle nearest to the subject vehicle is indicated.

Alternatively, for example, the obstacle position indicating system 100 may indicate the information on positions of multiple obstacles in such way that, beginning with the information on the position of the obstacle nearest to the subject vehicle, the information on the positions of the multiple obstacles is indicated in an order of increasing distance to the obstacle. More specifically, based on the information on the distances to the multiple obstacles identified by the obstacle position calculation device 2, the operating force control device 3 selects a target obstacle from the multiple obstacles in an order of increasing distance to the obstacle. That is, first, the obstacle nearest to the subject vehicle is selected, and next, the second nearest obstacle is selected. For each selected target obstacle, based on the information on the distance or the direction to the selected target obstacle, the operating force control device 3 performs the amplitude determination process and the period determination process to control the designated two solenoids 4 corresponding to the selected target obstacle. In this way, the information on the positions of the multiple obstacles is indicated in an order of increasing distance to the obstacle. When the number of solenoids 4 to be vibrated is two, the ratio of magnitude of amplitude of two solenoids 4 can be determined for the reciprocating motion of the two solenoids 4.

When the obstacle position calculation device 2 can identify the type of obstacle by the image recognition or the like, the information on the positions of multiple obstacles may be indicated in an order of descending obstacle-type-related priority, the obstacle-type-related priority being set according to the type of obstacle. For example, a pedestrian is given higher obstacle-type-related priority than a structural object.

In the above example configuration, the obstacle position calculation device 2 is configured to indicate information on all directions in a periphery of the vehicle by using eight solenoid 4 (4a to 4h). However, it is possible to employ other configurations. For example, the obstacle position calculation device 2 may be configured to use four solenoids to indicate information on all directions in the periphery of the vehicle or to indicate information on a leftward direction, a rightward direction, a forward direction and a rearward direction, although the use of the four solenoids may be inferior to the use of eight solenoids in indication performance. The four solenoids may be one of the solenoids 4a and 4b, one of the solenoids 4c and 4d, one of the solenoids 4e and 4f, and one of the solenoids 4g and 4h.

Alternatively, the four solenoids 4e to 4h may be used to indicate information on directions covering from a rearward direction to diagonally rearward directions of the subject vehicle. Alternatively, the two solenoids 4h and 4a may be used to indicate information on a leftward direction of the subject vehicle. Alternatively, the two solenoids 4a and 4b may be used to indicate information on a diagonally forwarded left direction of the subject vehicle. In this way, the number of solenoids 4 for the obstacle position indicating system 100 may be reduced according to an intended use.

Figure 11:
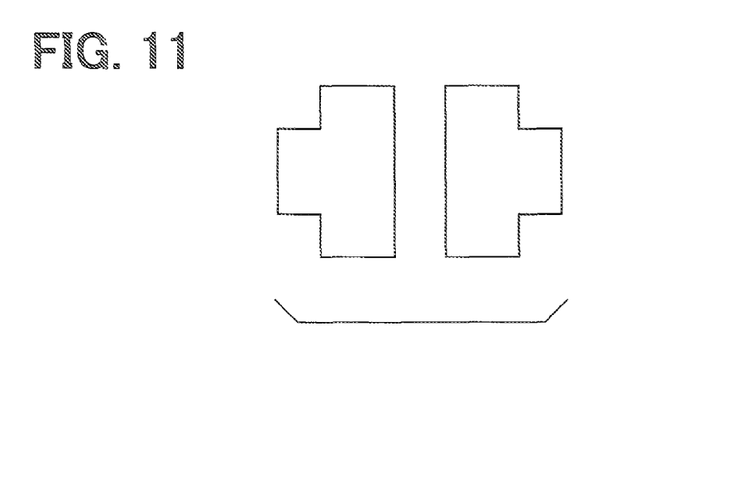
FIG. 11 is a diagram illustrating another example of shape of a planer surface of a vibration conduction plate.

Alternatively, as shown in FIG. 11, the vibration conduction plate 5 may be divided into pieces, so that the vibration conduction plate has multiple plate portion spaced apart from each other. In division of the vibration conduction plate 5, it may be preferable that the vibration conduction plate 5 be divided into a right piece and a left piece so that the occupant can touch the right piece with his or her right hand and the left piece with his or her left hand. It should be noted that even when the vibration conduction plate 5 is divided into pieces, the occupant touching the pieces with the right and left hands feels, as a combined vibration, the vibrations in the pieces generated by the reciprocating motion of the solenoids 4. Thus, even when the vibration conduction plate 5 is divided into pieces, it is possible to specifically indicate the information on the position of the obstacle to the occupant. Furthermore, the division of the vibration conduction plate 5 into pieces advantageously enables the occupant to perceive the information on the direction to the obstacle while clearly distinguishing the rightward direction and the leftward direction from each other. Furthermore, the division of the vibration conduction plate 5 into pieces can advantageously facilitate installation of the vibration conduction plate 5 to the center portion of the steering wheel.

In the above example configuration, the operating force control device 3 performs both of the amplitude determination process and the period determination process, and the information on the direction to the obstacle and the distance to the obstacle is indicated. However, the configuration is not limited to this configuration. For example, the operating force control device 3 may not perform the period determination process, and the information on the distance to the obstacle may not be indicated.

In the above example configuration, the obstacle position calculation device 2 and the operating force control device 3 are provided separately from each other. However, the configuration is not limited to this configuration. For example, the obstacle position calculation device 2 and the operating force control device 3 may be provided as a single element, e.g., a single ECU (electronic control unit).

In the above example configuration, the solenoid is used as an actuator. However, the configuration is not limited to this configuration. For example, any actuator can be used if the reciprocating motion of the actuator can apply an external force to an end of the vibration conduction plate 5 in the planer direction of the vibration conduction plate 5.

(Aspects)

According to an aspect of embodiments, an obstacle position indicating apparatus may be configured in the following ways. The obstacle position indicating apparatus is mounted to a vehicle and configured to indicate information on position of an obstacle existing around the vehicle to an occupant of the vehicle. The obstacle position indicating apparatus includes an obstacle position identification component, multiple actuators, a conduction plate and a drive control component. The obstacle position identification component is configured to identify the position of the obstacle based on a detection result of a sensor configured to detect the obstacle existing around the vehicle, such that the information on the position of the obstacle includes at least information on a direction to the obstacle relative to the vehicle. Each actuator is configured perform reciprocating motion. The conduction has a conduction plate and is mounted to equipment of the vehicle so that the conduction plate contacts the occupant when the equipment is being operated by the occupant. The conduction plate is configured to conduct vibration generated by an external force caused by the reciprocating motion of the actuators. The drive control component is configured to control the reciprocating motion of the actuators in respect to at least magnitude of amplitude of the reciprocating motion. The multiple actuators are spaced apart from each other and arranged in a periphery of the conduction plate so as to give the external force to an end of the conduction plate in a planer direction of the conduction plate. The periphery of the conduction plate and the end of the conduction plate are, respectively, the periphery and the end in the planer direction of the conduction plate. The drive control component is further configured to determine a ratio of magnitude of amplitude of designated two actuators, which are included in the multiple actuators, in accordance with the information on the direction to the obstacle identified by the obstacle position identification component. The drive control component is further configured to cause the designated two actuators to perform the reciprocating motion in accordance with the determined ratio of magnitude of amplitude of the designated two actuators. A direction of the reciprocating motion of one of the designated two actuators and a direction of the reciprocating motion of the other of the designated two actuators are a same direction or a cross direction. The conduction plate is configured to conduct the vibration, which results from the reciprocating motion of the designated two actuators, to a hand of the occupant touching the conduction plate, thereby indicating the information on the direction to the obstacle.

In this relation, the inventors of the present application have discovered that when the conduction plate is vibrated by varying the ratio of magnitude of amplitude of the two actuators spaced apart from each other, the occupant touching the conduction plate with his or her hand feels the following direction as a vibration source. The direction felt as the vibration source is a direction between the two actuators that corresponds to the ratio of magnitude of amplitude of the two actuators. That is, according to the above obstacle position indicating apparatus, the occupant can feel, as the vibration source, not only directions in which the actuators are located but also directions in which the actuators are not located. It is therefore possible to more specifically provide the occupant with the information on the position of the obstacle.

Moreover, according to the above obstacle position indicating apparatus, since the directions that the occupant can feel as the vibration source include not only directions in which the actuators are located but also directions in which the actuators are not located. That is, the occupant can feel directions between the actuators as the vibration source. Therefore, when the number of indicating-possible directions is increased, an increase in the number of actuators can be suppressed. In the above, the indicating-possible directions are directions that the obstacle position indicating system is capable of indicating to the occupant.

Moreover, in the above configuration, the vibration from the actuators is transmitted to the hand of the occupant via the conduction plate. Thus, in order to receive the information on the position of the obstacle, the occupant is not required to have direct contact with a portion in which the actuators are located.

As can be seen the above, it becomes possible to provide the above obstacle position indicating apparatus that is capable of specifically indicating the position of an obstacle to an occupant, and that has high usability.

The obstacle position indicating apparatus may be configured in the following way. The drive control component is capable of controlling period of amplitude of the reciprocating motion of each of the multiple actuators. The information on the position of the obstacle identified by the obstacle position identification component further includes information on a distance to the obstacle relative to the vehicle. The driver control component is further configured to determine the period of amplitude of the reciprocating motion of each of the designated two actuators in accordance with the information on the distance to the obstacle identified by the obstacle position identification component, such that the period of amplitude of the reciprocating motion of each of the designated two actuators is made smaller as the distance to the obstacle is smaller. The conduction plate conducts the vibration, which results from the reciprocating motion of the designated two actuators, to the hand of the occupant touching the conduction plate, thereby providing the occupant with the information on the distance to the obstacle.

According to this configuration, the period of the vibration of the conduction plate becomes larger as the distance to the obstacle is larger, and the period of the vibration of the conduction plate becomes smaller as the distance to the obstacle is smaller. As a result, the occupant can intuitively recognize the distance to the obstacle by perceiving a state of the vibration transmitted via the conduction plate 5. Therefore, it becomes possible to specifically indicate the distance to the obstacle to the occupant.

The above obstacle position indicating apparatus may be configured in the following way. The conduction plate has four regions when a first reference axis and a second reference axis, which intersect with each other at right angles on a surface of the conduction plate and which respectively correspond to a front-to-rear direction of the vehicle and a left-to-right direction of the vehicle, are assumed to divide the conduction plate into the four regions. At least two of the multiple actuators are respectively arranged for at least adjacent two of the four regions of the conduction plate, so that the at least two of the multiple actuators are arranged in a direction in which the at least adjacent two of the four regions are arranged.

According to this configuration, at least two actuators are arranged in either one of the first reference axis corresponding to the front-to-rear direction of the vehicle and the second reference axis corresponding to the left-to-rear direction of the vehicle. Therefore, it becomes possible to indicate the specific obstacle position information about the front-to-rear direction of the vehicle or the left-to-rear direction of the vehicle.

The above obstacle position indicating apparatus may be configured in the following way. The conduction plate has four regions when a first reference axis and a second reference axis, which intersect with each other at right angles on a surface of the conduction plate and which respectively correspond to a front-to-rear direction of the vehicle and a left-to-right direction of the vehicle, are assumed to divide the conduction plate into the four regions. The multiple actuators include at least set of a first actuator and a second actuator. A direction of the reciprocating motion of the first actuator is parallel to the first reference axis. A direction of the reciprocating motion of the second actuator is parallel to the second reference axis. The at least set of the first actuator and the second actuator is arranged for at least one of the four regions of the conduction plate.

According to this configuration, at least two actuators are arranged in an angular direction between the first reference axis corresponding to the front-to-rear direction of the vehicle and the second reference axis corresponding to the left-to-right direction of the vehicle. Therefore, it becomes possible to indicate the specific obstacle position information about at least one of the diagonally forward right direction of the vehicle, the diagonally rearward right direction of the vehicle, the diagonally forward left direction of the vehicle, and the diagonally rearward left direction of the vehicle.

The above obstacle position indicating apparatus may be configured in the following way. The multiple actuators include four sets of actuators. Each of the four sets of actuators includes the first actuator, the direction of the reciprocating motion of which is parallel to the first reference axis, and the second actuator, the direction of the reciprocating motion of which is parallel to the second reference axis. The four sets of actuators are arranged for the four regions of the conduction plate, respectively.

According to this configuration, it becomes possible to indicate the specific obstacle position information about all directions in a periphery of the vehicle, such as the diagonally forward right direction of the vehicle, the diagonally rearward right direction of the vehicle, the diagonally forward left direction of the vehicle and the diagonally rearward left direction of the vehicle.

The above obstacle position indicating apparatus may be configured in the following way. The conduction plate has four regions when a first reference axis and a second reference axis, which intersect with each other at right angles on a surface of the conduction plate and which respectively correspond to a front-to-rear direction of the vehicle and a left-to-right direction of the vehicle, are assumed to divide the conduction plate into the four regions. The multiple actuators are four actuators that are arranged for the four regions of the conduction plate, respectively.

According to this configuration, it becomes possible to indicate the specific obstacle position information about four directions of the vehicle such as the leftward direction, the right direction, the frontward direction and the rearward direction of the vehicle.

The drive control component may perform a control operation in response to the identification of multiple obstacles around the vehicle by the obstacle position identification component.

For example, the above obstacle position indicating apparatus may be configured in the following way. The obstacle position identification component identifies a distance to the obstacle relative to the vehicle as a part of the information on the position of the obstacle. When the obstacle position identification component identifies multiple obstacles around the vehicle, the drive control component (i) selects one obstacle nearest to the vehicle from among the multiple obstacles in accordance with the information on respective distances to the multiple obstacles relative to the vehicle, (ii) determines the ratio of magnitude of amplitude of the designated two actuators in accordance with the information on the position of the selected one obstacle relative to the vehicle, and (iii) causes the designated two actuator to perform the reciprocating motion in accordance with the determined ratio of magnitude of amplitude of the designated two actuators.

According to the above configuration, when the obstacle position identification component identifies multiple obstacles around the vehicle, it is possible to provide the occupant with the information on the position of the obstacle nearest to the vehicle only.

Alternatively, the obstacle position indicating apparatus may be configured in the following way. The information on the position of the obstacle identified by the obstacle position identification component further includes information on a distance to the obstacle relative to the vehicle. When the obstacle position identification component identifies multiple obstacles around the vehicle, the drive control component (i) selects a target obstacle from among the multiple obstacles in order of increasing distance relative to the vehicle in accordance with the information on respective distances to the multiple obstacles relative to the vehicle, (ii) determines the ratio of magnitude of amplitude of the designated two actuators in accordance with the information on the position of the selected target obstacle relative to the vehicle, and (iii) causes the designated two actuator to perform the reciprocating motion in accordance with the determined ratio of magnitude of amplitude of the designated two actuators.

According to this configuration, when the obstacle position identification component identifies multiple obstacles around the vehicle, it is possible provide the occupant with the information on the positions of the multiple obstacles in order of increasing distance to the vehicle beginning with the nearest obstacle.

The above obstacle position indicating apparatus may be configured such that the equipment of the vehicle is a steering wheel. The obstacle position indicating apparatus may be configured such that: the drive control component selects the designated two actuators from among the multiple actuators according to the direction to the obstacle relative to the vehicle. The obstacle position indicating apparatus may be configured such that: the conduction plate has multiple plate portion spaced apart from each other.

According to a second aspect of embodiments, an obstacle position indicating system includes the above-described obstacle position indicating apparatus and a sensor configured to detect the obstacle existing around the vehicle. This obstacle position indicating system can also specifically indicate the position of the obstacle to the occupant, and high usability.

While the invention has been described above with reference to various embodiments thereof, it is to be understood that the invention is not limited to the above described embodiments and constructions. The invention is intended to cover various modifications and equivalent arrangements.

What is claimed is:

1. An obstacle position indicating apparatus mounted to a vehicle, comprising:
   an obstacle position specifying component that specifies position of an obstacle based on a detection result of a sensor detecting the obstacle existing around the vehicle, wherein the specified position of the obstacle includes information on at least a direction to the obstacle relative to the vehicle, wherein the position of the obstacle specified by the obstacle position specifying component is indicated to an occupant of the vehicle;
   a plurality of actuators each configured to perform reciprocating motion;
   a conduction plate that
      has a plate shape,
      is mounted to equipment of the vehicle so that the conduction plate is in contact with the occupant when the equipment is being operated by the occupant, and
      conducts vibration generated by an external force, wherein the external force is applied by the reciprocating motions of the plurality of actuators; and
   a drive control component that controls at least amplitude of the reciprocating motion of each of the plurality of actuators,
   wherein:
   the plurality of actuators is spaced apart from each other and arranged in a periphery of the conduction plate so that the reciprocating motions of the plurality of actuators give the external force to an end of the conduction plate in a planer direction of the conduction plate;

the periphery of the conduction plate and the end of the conduction plate are, respectively, the periphery and the end in the planer direction of the conduction plate;

the drive control component determines an amplitude ratio of designated two actuators of the plurality of actuators in accordance with the information on the direction to the obstacle specified by the obstacle position specifying component, wherein a direction of the reciprocating motion of one of the designated two actuators and a direction of the reciprocating motion of the other of the designated two actuators are a same direction or crossing directions, and causes the designated two actuators to perform the reciprocating motions according to the determined amplitude ratio; and the conduction plate conducts the vibration, which results from the reciprocating motions of the designated two actuators, to a hand of the occupant touching the conduction plate to provide the occupant with the information on the direction to the obstacle.

2. The obstacle position indicating apparatus according to claim 1, wherein:

the drive control component controls a period of the reciprocating motion of each of the plurality of actuators;

the information on the position of the obstacle specified by the obstacle position specifying component further includes information on a distance from the vehicle to the obstacle;

the driver control component determines the period of the reciprocating motion of each of the designated two actuators in accordance with the information on the distance to the obstacle specified by the obstacle position specifying component, such that the period becomes smaller as the distance to the obstacle becomes smaller; and causes the designated two actuators to perform the reciprocating motions according to the determined periods; and the conduction plate conducts the vibration, which results from the reciprocating motions of the designated two actuators, to the hand of the occupant touching the conduction plate to provide the occupant with the information on the distance to the obstacle.

3. The obstacle position indicating apparatus according to claim 1, wherein:

a first reference axis and a second reference axis, which intersect with each other at right angles on a surface of the conduction plate, and which respectively correspond to a front-to-rear direction of the vehicle and a left-to-right direction of the vehicle, divide the conduction plate into four regions; and at least one actuator, which is included in the plurality of actuators, is provided to each of adjacent two regions of the four regions of the conduction plate so as to be arranged in a direction in which the adjacent two of the four regions are arranged.

4. The obstacle position indicating apparatus according to claim 1, wherein:

a first reference axis and a second reference axis, which intersect with each other at right angles on a surface of the conduction plate, and which respectively correspond to a front-to-rear direction of the vehicle and a left-to-right direction of the vehicle, divide the conduction plate into four regions; and a first one of the plurality of actuators whose reciprocating motion is parallel to the first reference axis and a second one of the plurality of actuators whose reciprocating motion is parallel to the second reference axis are provided to at least one of the four regions of the conduction plate.

5. The obstacle position indicating apparatus according to claim 4, wherein:

the plurality of actuators includes four sets of a first actuator and a second actuator, wherein the reciprocating motion of the first actuator is parallel to the first reference axis and the reciprocating motion of the second actuator is parallel to the second reference axis, wherein the four sets of the first actuator and the second actuator are respectively provided to the four regions of the conduction plate.

6. The obstacle position indicating apparatus according to claim 1, wherein:

a first reference axis and a second reference axis, which intersect with each other at right angles on a surface of the conduction plate, and which respectively correspond to a front-to-rear direction of the vehicle and a left-to-right direction of the vehicle, divide the conduction plate into four regions; and the plurality of actuators are four actuators that are provided to the four regions of the conduction plate, respectively.

7. The obstacle position indicating apparatus according to claim 1, wherein:

the information on the position of the obstacle specified by the obstacle position specifying component further includes information on a distance from the vehicle to the obstacle; and when the obstacle position specifying component specifies a plurality of obstacles around the vehicle, the drive control component selects one obstacle nearest to the vehicle from among the plurality of obstacles in accordance with the information on the distances to the plurality of obstacles, determines the amplitude ratio of the designated two actuators in accordance with the information on the position of the selected one obstacle relative to the vehicle, and causes the designated two actuator to perform the reciprocating motions according to the determined amplitude ratio of the designated two actuators.

8. The obstacle position indicating apparatus according to claim 1, wherein:

the information on the position of the obstacle specified by the obstacle position specifying component further includes information on a distance from the vehicle to the obstacle; and when the obstacle position specifying component specifies a plurality of obstacles around the vehicle, the drive control component selects a target obstacle from among the plurality of obstacles in order of increasing distance from the vehicle in accordance with the information on the distances to the plurality of obstacles relative to the vehicle, determines the amplitude ratio of the designated two actuators according to the information on the position of the selected target obstacle relative to the vehicle, and causes the designated two actuator to perform the reciprocating motions in accordance with the determined amplitude ratio.

9. The obstacle position indicating apparatus according to claim 1, wherein:
the equipment of the vehicle is a steering wheel.

10. An obstacle position indicating system comprising:
a sensor that detects an obstacle existing around a vehicle; and
an obstacle position indicating apparatus recited in claim 1.

* * * * *